(12) United States Patent
Swanson

(10) Patent No.: US 9,211,774 B2
(45) Date of Patent: Dec. 15, 2015

(54) VEHICLE LOAD MANAGEMENT

(71) Applicant: Continental Automotive Systems, Inc., Auburn Hills, MI (US)

(72) Inventor: Vaughn James Swanson, West Bloomfield, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/282,588

(22) Filed: May 20, 2014

(65) Prior Publication Data

US 2014/0350787 A1    Nov. 27, 2014

Related U.S. Application Data

(60) Provisional application No. 61/827,144, filed on May 24, 2013.

(51) Int. Cl.
| | | |
|---|---|---|
| *B60W 10/22* | (2006.01) | |
| *B60G 17/00* | (2006.01) | |
| *B60G 17/019* | (2006.01) | |
| *B60G 17/017* | (2006.01) | |
| *B60G 17/0195* | (2006.01) | |
| *G01G 19/02* | (2006.01) | |

(52) U.S. Cl.
CPC ............ *B60G 17/019* (2013.01); *B60G 17/017* (2013.01); *B60G 17/0195* (2013.01); *B60G 2204/113* (2013.01); *B60G 2400/252* (2013.01); *B60G 2400/51222* (2013.01); *B60G 2400/52* (2013.01); *B60G 2400/63* (2013.01); *B60G 2800/984* (2013.01); *G01G 19/02* (2013.01)

(58) Field of Classification Search
USPC ...................... 701/36–41, 48, 70–74; 702/174
See application file for complete search history.

(56) References Cited

U.S. PATENT DOCUMENTS

| | | | |
|---|---|---|---|
| 4,832,141 A * | 5/1989 | Perini et al. .................... | 177/141 |
| 5,780,783 A * | 7/1998 | Heider et al. .................. | 177/137 |
| 6,526,334 B1 | 2/2003 | Latarnik et al. | |
| 6,915,884 B1 * | 7/2005 | Glazier ......................... | 188/195 |
| 2003/0230443 A1 * | 12/2003 | Cramer et al. ............... | 180/65.5 |
| 2011/0093239 A1 * | 4/2011 | Holbrook et al. ............. | 702/174 |
| 2012/0290171 A1 * | 11/2012 | Koumura ........................ | 701/37 |
| 2015/0046032 A1 * | 2/2015 | Clarke et al. .................... | 701/37 |

FOREIGN PATENT DOCUMENTS

DE            19904216 A1    1/2000

OTHER PUBLICATIONS

European Search Report dated Feb. 26, 2015.

* cited by examiner

*Primary Examiner* — Yonel Beaulieu

(57) ABSTRACT

A method of managing a vehicle load comprises measuring for one of a plurality of tire pressures with a tire sensor associated with each of the plurality of tires and a plurality of pressures and heights with a plurality of suspension sensors associated with each of a plurality of corner assemblies for an air suspension system. The vehicle load is calculated for each of the plurality of corner assemblies with an ECU based on the measured data. At least one load dependent vehicle characteristic is calculated based on the vehicle load at the individual corner assemblies with the ECU. At least one vehicle operating parameter is adjusted to compensate for the at least one load dependent vehicle characteristic.

20 Claims, 3 Drawing Sheets

VEHICLE LOAD MANAGEMENT

CROSS-REFERENCE TO RELATED APPLICATIONS

This disclosure claims priority to U.S. Provisional Application No. 61/827,144, which was filed on May 24, 2013 and is incorporated herein by reference.

TECHNICAL FIELD

The present disclosure relates to automotive vehicles and more particularly to load management for automotive vehicles.

BACKGROUND

Suspension systems for automotive vehicles provide vehicle passengers with a more comfortable ride. Demand from vehicle owners for more controls and options has led to the development of adjustable air suspension systems. Depending on the current driving surface, different suspension operating modes may be selected by the vehicle operator. The suspension operating modes have present suspension parameters to provide the ideal suspension arrangement for various driving situations. Typical operating modes a driver may select include, a standard driving mode, a snow mode, an off-roading mode, etc. In addition to providing selected operating modes for various driving situations the suspension system may be adjusted when select operating conditions are met.

Tire pressure monitor systems monitor tire pressure and provide warnings to a vehicle operator when the pressure vary outside the ideal operating range. However, the ideal operating range of tire pressure varies based on vehicle load. Known systems may only accommodate for this if vehicle load is manually input into the tire pressure monitor system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vehicle load management system comprises a plurality of tire sensors, wherein each of the plurality of tire sensors measures at least a pressure for an associated tire. An air suspension system has four corner assemblies. One corner assembly is located at a suspension position corresponding to each of the wheel corners for the vehicle. An air supply unit including an ECU is connected to the corner assemblies. The air supply unit is capable of independently adjusting the corner assemblies from one another. A plurality of suspension sensors each measure at least a pressure and a height for an associated corner assembly. The vehicle load at the individual corner assemblies can be calculated based upon the data from at least one of the plurality of tire sensors and the plurality of suspension sensors. The vehicle load at each corner is used to calculate at least one load dependent vehicle characteristic which can be used by a vehicle system to adjust at least one vehicle operating parameter to compensate for the at least one load dependent vehicle characteristic.

A vehicle load management system comprises a plurality of tire sensors, wherein each of the plurality of tire sensors measures at least a pressure for an associated tire. An air suspension unit has four corner assemblies, wherein one corner assembly is located at a suspension position corresponding to each of the wheel corners for the vehicle. An air supply unit for the suspensions system is capable of independently adjusting the corner assemblies from one another. A plurality of suspension sensors each measure at least a pressure and a height for an associated corner assembly. An ECU is connected to the corner assemblies and includes instructions for calculating vehicle load at the individual corner assemblies based upon the measured data, calculating at least one load dependent vehicle characteristic based on the vehicle load at the individual corner assemblies and adjusting at least one vehicle operating parameter to compensate for the at least one load dependent vehicle characteristic.

A method of managing a vehicle load comprises measuring for one of a plurality of tire pressures with a tire sensor associated with each of the plurality of tires and a plurality of pressures and heights with a plurality of suspension sensors associated with each of a plurality of corner assemblies for an air suspension system. The vehicle load is calculated for each of the plurality of corner assemblies with an ECU based on the measured data. At least one load dependent vehicle characteristic is calculated based on the vehicle load at the individual corner assemblies with the ECU. At least one vehicle operating parameter is adjusted to compensate for the at least one load dependent vehicle characteristic.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
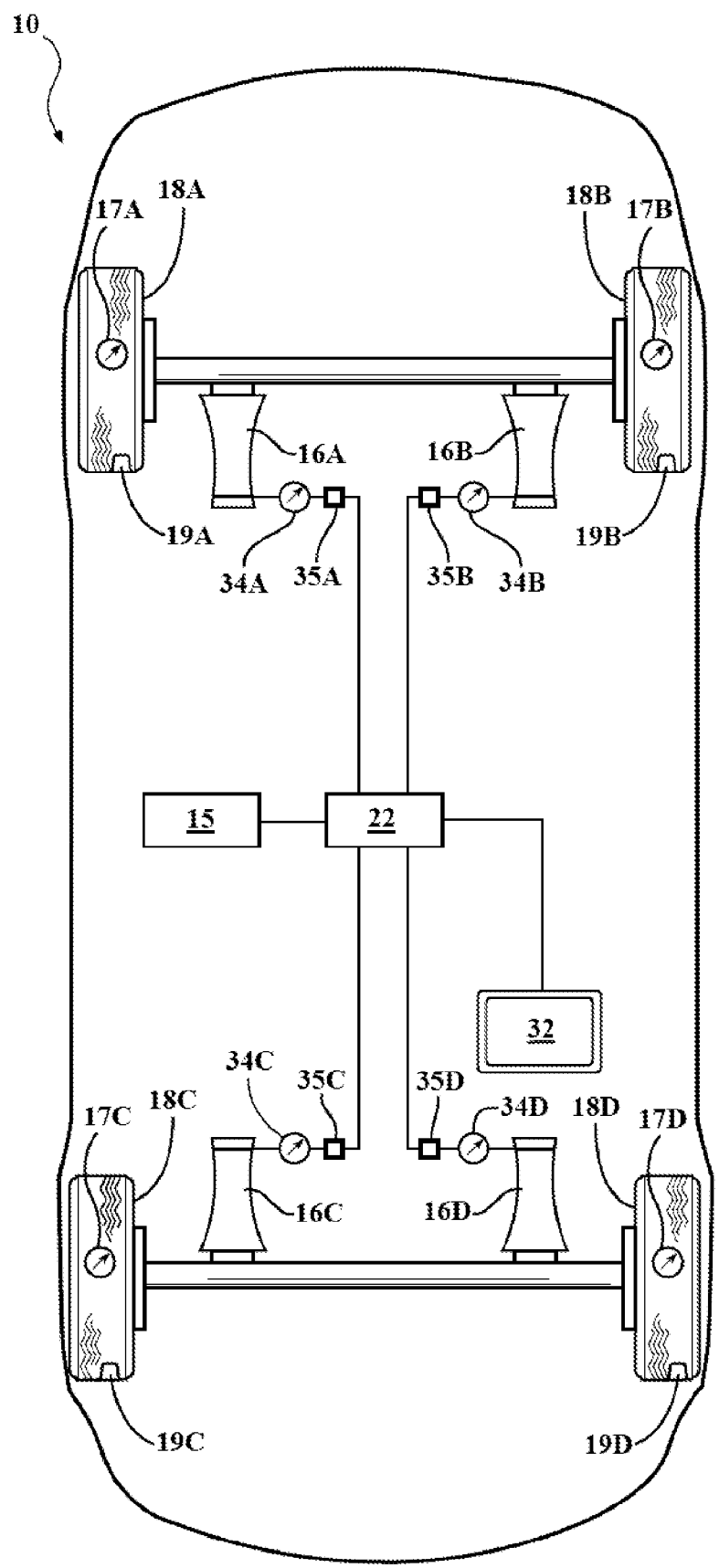
FIG. 1 is a schematic illustration of one embodiment of as system for measuring vehicle load of the present invention.
Figure 2:
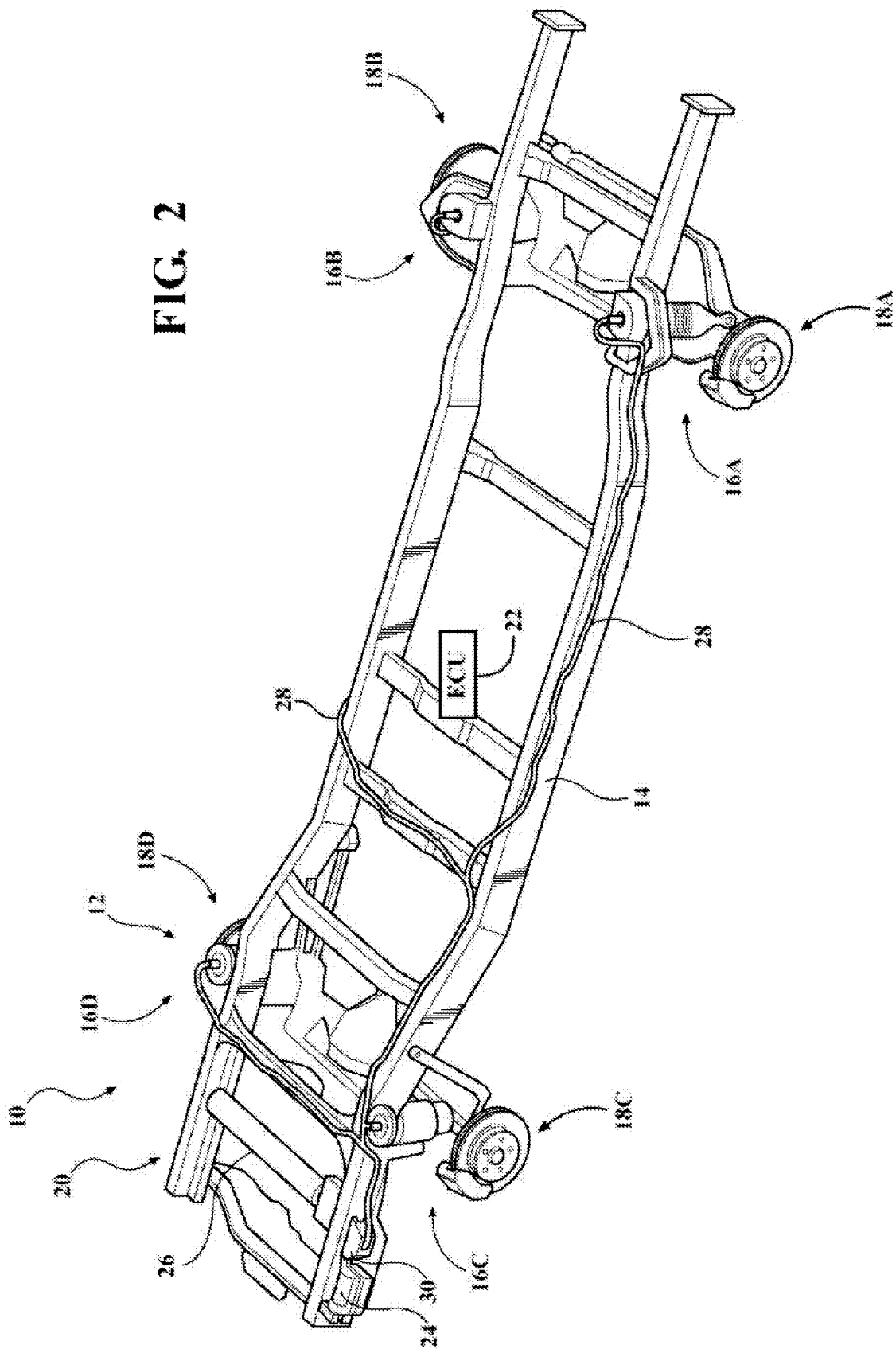
FIG. 2 is a schematic illustration of an air suspension system for use with the load management system of FIG. 1.

The following description is merely exemplary in nature and is in no way intended to limit the disclosure, its application, or uses. For purposes of clarity, the same reference numbers will be used in the drawings to identify similar elements. FIGS. 1 and 2 illustrate a vehicle 10 having a load management system 11. The load management system 11 may take advantage of an air suspension system 12 and a tire pressure monitoring system 13, as described in detail below.

The air suspension system 12 is supported by a frame 14. The air suspensions system has four corner assemblies 16A-D located at each of the wheel 18A-D locations of the vehicle 10. The four corner assemblies 16A-D may be independently adjustable. Two corner assemblies 16A, B are located at the front wheel 18A, B corners of the vehicle 10 and two corner assemblies 16C, D are located at the rear wheel 18C, D corners of the vehicle.

The air suspension system 12 includes an air supply unit 20 fluidly connected to the four corner assemblies 16A-D. The air supply unit 20 includes an electronic control unit 22, a compressor 24, a reservoir 26 and a valve block 30. The individual components of the air supply unit may be assembled together or supported on the vehicle at separate locations. In the embodiment shown the ECU 22 is located remote from the compressor 24, reservoir 26 and valve block 30. The air supply unit 20 is connected to the four corner assemblies 16A-D through the supply lines 28. In the example shown, the air suspension system 12 is a closed system. The valve block 30 is controlled by the ECU 22 to regulate the air supply between the compressor 24, the reservoir 26 and the four corner assemblies 16A-D. The valve block 30 may be a single unit defining multiple valves, multiple valves located together, or multiple valves at different locations. Additionally, the reservoir 26 may be a single or multiple tank assembly.

The four corner assemblies 16A-D are capable of moving independently from one another to provide load leveling for the vehicle 10. The four corner assemblies 16A-D are also independently adjustable to accommodate various driving conditions. The suspension mode is controlled through a selector (not shown) adjustable by an operator of the vehicle 10. Based upon the selected suspension mode the ECU 22 will regulate the air supply between the compressor 24, reservoir 26 and the four corner assemblies 16A-D to independently adjust the four corner assemblies 16A-D from the current positions/pressures to the desired positions/pressure. When lowering any of the corner assemblies 16A-D the excess air is sent to the reservoir 26 for storage. When raising any of the corner assemblies 16A-D the required air is sent from the reservoir 26 to the appropriate corner assembly 16A-D. The compressor 24 ensures that the air pressure within the system 12 is maintained at the desired level. Alternately, in the instance of an open system the excess air is released to the environment or pulled from the environment and pressurized as needed. The compressor 24 ensures that the air pressure within the system 12 is maintained at the desired level.

Suspension sensors 34A-D, 36A-D associated with each corner assembly 16A-D can gather information about the state of the suspension system 12, including pressure at each of the corner assemblies 16A-D and a of the suspension system 12 height at each of the corner assemblies 16A-D. The detected information, including load and/or height from the suspension sensors 34A-D, 36A-D are reported to the ECU 22.

The tire pressure monitor system (TPMS) 13 also may include an electronic control unit (ECU) 15 in communication with tire pressure sensors (TPS) 17A-D and intelligent tire sensors (ITS) 19A-D located at each of the tires 18A-D. The TPS 17A-D and ITS 19A-D are capable of monitoring pressure and other information within the corresponding tire assemblies 18A-D and reporting the information to the TPMS ECU 15. The TPMS ECU 15 monitors the information, including the tire pressure. The TPMS ECU 15 provides an alert for the vehicle operator when the pressure in any of the tire assemblies 18A-D is outside a desired pressure range.

The load management system 11, may use the suspension ECU 22, or the TPMS ECU 15 (or both systems may utilize a common ECU). The tires sensors 17A-D, 19A-d and/or the suspension sensors 34A-D, 35A-D are used to provide accurate load calculation for the vehicle 10. The suspension sensors including the suspension pressure sensors 34A-D and the ride height sensors 35A-D report information, which can be used to determine the pressure and vehicle load at each corner assembly 16A-D. The TPS 17A-D and the ITS 19A-D report information, which can be used to determine the pressure and vehicle load at each tire 18A-D. Thus, both load of the vehicle 10 at each corner of the suspension system 12 and at each tire assembly 18A-D can be calculated. The vehicle load can be calculated using either of the ECUs 15 or 22.

When vehicle load (VL) is available independently at each corner assembly 16A-D and/or each wheel 18A-D a load dependant characteristic for the vehicle 10 can be calculated. For example, the load dependant characteristic may be desired tire pressure since loading on a vehicle 10 can affect the desired pressure range for the tire assemblies 18A-D. The load dependant characteristic may also be Vehicle Center of Gravity (CG). Based upon the load dependant characteristic at least one vehicle operating parameter may be altered, as described in further detail below.

In one embodiment, the TMPS ECU 15 adjusts the desired pressure range for the tire assemblies 18A-D according to the vehicle load information reported by the tires sensors 17A-D, 19A-d and/or the suspension sensors 34A-D, 36A-D. The tires sensors 17A-D, 19A-d and/or the suspension sensors 34A-D, 36A-D detect loading at the corner assemblies 16A-D and/or tire assemblies 18A-D individually. Therefore, the TPMS 13 can individually detect and alter a desired pressure range for each of the tire assemblies 18A-D. The tire assemblies 18A-D may be individually adjusted in pressure to remain within the desired pressure range. Therefore, under-inflation of the tires 18A-D is avoided by increasing tire pressure in proportion to vehicle 10 loading. The vehicle operator may be warned when the pressure in any of the tire assemblies 18A-D is outside the desired range. The above embodiment can also be used to avoid over-loading of any of the individual tire assemblies 18A-D when vehicle load is unevenly distributed or exceeds maximum vehicle 10 load limits.

When the load dependant characteristic is vehicle CG, the center of gravity can be calculated at vehicle 10 to detect any shifts in loading during operation, such as when an ascent or descent is detected, and after the vehicle 10 makes certain maneuvers, e.g. turns, which might affect the balance of vehicle load.

The vehicle 10 load and center of gravity can be used by other vehicle systems which may have a load dependent characteristic including: a stability control system, a suspension system, a vehicle steering system, and safe vehicle speed may also be a load dependent characteristic. The stability control systems may include an anti-lock brake system, an electronic stability control system, a roll control system, a traction control system, a hill descent control system, and a hill assist system.

The vehicle systems can use the load dependent characteristic including center of gravity information, to be tuned for optimum safety and performance, e.g. the suspension system (springs & dampers) can be adjusted for optimum performance & safety. Further, unsecured loads can be identified when the CG changes while driving. If a load is determined to be unsecured, the driver can be warned. Vehicle performance (speed and handling) can be limited when loads are heavy, unsecured, un-balanced or have a High center of gravity (CG).

Additionally, when GPS/topographic data are combined with the load and/or CG data and vehicle trajectory is known, vehicle dynamics can be influenced (i.e. speed reduced) to assist driver in critical driving situations.

Figure 3:
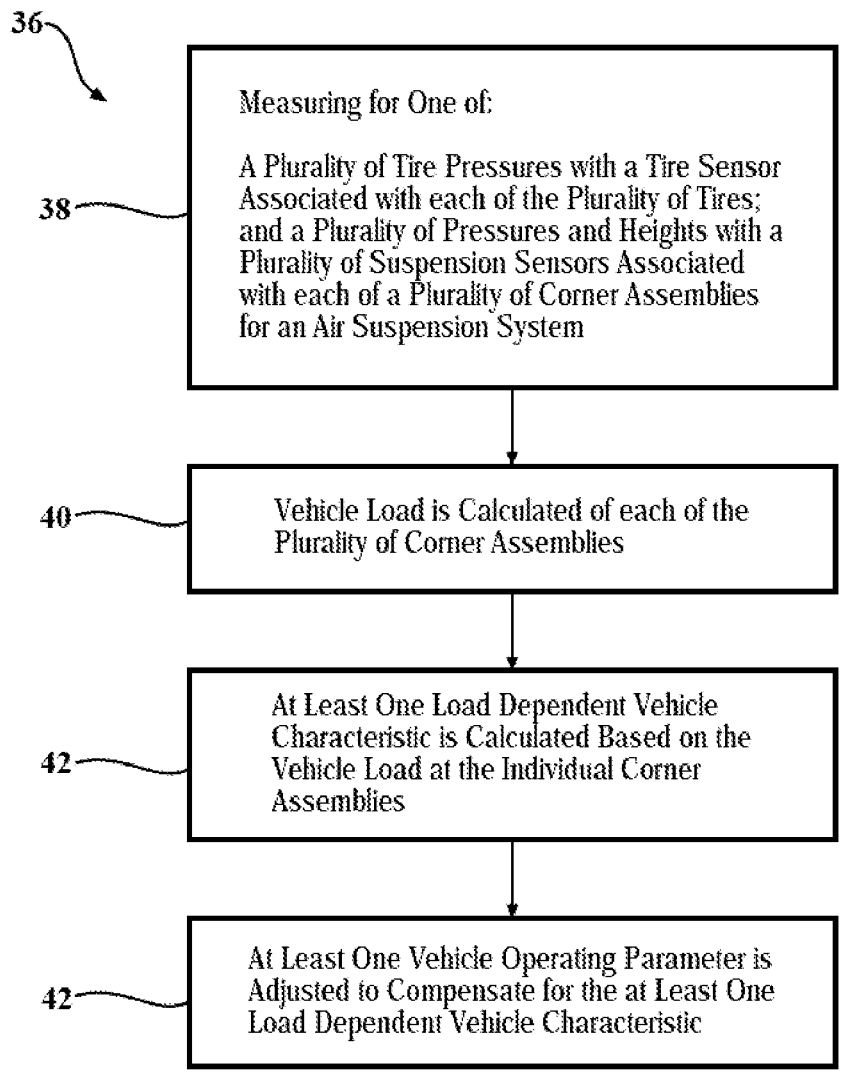
FIG. 3 is a schematic illustration of one embodiment of a method of managing vehicle load for use with the load management system of FIGS. 1-2.

Referring to FIG. 3, a method of managing a vehicle load, shown at 36, comprises measuring for one of a plurality of tire pressures with a tire sensor associated with each of the plurality of tires and a plurality of pressures and heights with a plurality of suspension sensors associated with each of a plurality of corner assemblies for an air suspension system, shown at 38. The vehicle load is calculated for each of the plurality of corner assemblies with an ECU based on the measured data, shown at 40. At least one load dependent vehicle characteristic is calculated based on the vehicle load at the individual corner assemblies with the ECU, shown at 42. At least one vehicle operating parameter is adjusted to compensate for the at least one load dependent vehicle characteristic, shown at 44.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A vehicle load management system comprising:
 a plurality of tire sensors, wherein each of the plurality of tire sensors measures at least a pressure for an associated tire;
 an air suspension system having corner assemblies, wherein one corner assembly is located at a suspension position corresponding to each of the wheel corners for the vehicle and an air supply unit including an ECU connected to the corner assemblies, wherein the air supply unit is capable of independently adjusting the corner assemblies from one another;
 a plurality of suspension sensors, wherein each of the plurality of suspension sensors measures at least a pressure and a height for an associated corner assembly;
 wherein the vehicle load at the individual corner assemblies is calculated based upon the data from at least one of the plurality of tire sensors and the plurality of suspension sensors associated with the individual corner assembly; and
 wherein the vehicle load at each corner is used to calculate at least one load dependent vehicle characteristic utilized by a vehicle system to adjust at least one vehicle operating parameter to compensate for the at least one load dependent vehicle characteristic.

2. The vehicle load management system of claim 1, wherein the at least one load dependent vehicle characteristic is a center of gravity for the vehicle.

3. The vehicle load management system of claim 2, wherein the at least one recommend vehicle operating parameter adjusted based on the center of gravity is one of: a stability control system characteristic, a suspension system characteristic, a vehicle speed, a vehicle steering characteristic.

4. The vehicle load management system of claim 3, wherein the stability control system characteristic is a characteristic for one of: an anti-lock brake system, an electronic stability control system, a roll control system, a traction control system, a hill descent control system, and a hill assist system.

5. The vehicle load management system of claim 2, wherein the center of gravity for the vehicle is updated repeatedly to detect a shift in load while the vehicle is moving.

6. The vehicle load management system of claim 1, wherein the at least one load dependent vehicle characteristic is a desired tire pressure for each of the plurality of tires, and wherein the at least one recommended vehicle operating parameter adjusted is the pressure of at least one of the plurality of tires.

7. A vehicle load management system comprising:
 a plurality of tire sensors, wherein each of the plurality of tire sensors measures at least a pressure for an associated tire;
 an air suspension system having four corner assemblies, wherein one corner assembly is located at a suspension position corresponding to each of the wheel corners for the vehicle and an air supply unit, wherein the air supply unit is capable of independently adjusting the corner assemblies from one another;
 a plurality of suspension sensors, wherein each of the plurality of suspension sensors measures at least a pressure and a height for an associated corner assembly; and
 an ECU connected to the corner assemblies, wherein the ECU includes instructions for;
 calculating vehicle load at the individual corner assemblies based upon the data from one of the plurality of tire sensors and the plurality of suspension sensors associated with each individual corner assembly;
 calculating at least one load dependent vehicle characteristic based on the vehicle load at the individual corner assemblies; and
 adjusting at least one vehicle operating parameter to compensate for the at least one load dependent vehicle characteristic.

8. The vehicle load management system of claim 7, wherein the at least one load dependent vehicle characteristic is a center of gravity for the vehicle.

9. The vehicle load management system of claim 8, wherein the at least one recommend vehicle operating parameter adjusted based on the center of gravity is one of: a stability control system characteristic, a suspension system characteristic, a vehicle speed, a vehicle steering characteristic.

10. The vehicle load management system of claim 9, wherein the stability control system characteristic is a characteristic for one of: an anti-lock brake system, an electronic stability control system, a roll control system, a traction control system, a hill descent control system, and a hill assist system.

11. The vehicle load management system of claim 8, wherein the ECU further comprises instructions for updating the center of gravity for the vehicle calculated to detect a shift in load while the vehicle is moving.

12. The vehicle load management system of claim 7, wherein the at least one load dependent vehicle characteristic is a desired tire pressure for each of the plurality of tires, and wherein the at least one recommended vehicle operating parameter adjusted based on the pressure is at least one of the plurality of tires.

13. A method of managing a vehicle load comprising:
 measuring for one of;
 a plurality of tire pressures with a tire sensor associated with each of the plurality of tires; and
 a plurality of pressures and heights with a plurality of suspension sensors associated with each of a plurality of corner assemblies for an air suspension system;
 calculating vehicle load at each of the plurality of corner assemblies with an ECU based on the measured data;
 calculating at least one load dependent vehicle characteristic based on the vehicle load at the individual corner assemblies with the ECU; and adjusting at least one vehicle operating parameter to compensate for the at least one load dependent vehicle characteristic.

14. The method of claim 13, wherein the at least one load dependent vehicle characteristic is a center of gravity for the vehicle.

15. The method of claim 14, wherein the at least one recommend vehicle operating parameter adjusted based on the center of gravity is one of: a stability control system characteristic, a suspension system characteristic, a vehicle speed, a vehicle steering characteristic.

16. The method of claim 15, wherein the stability control system characteristic is a characteristic for one of: an anti-lock brake system, an electronic stability control system, a roll control system, a traction control system, a hill descent control system, and a hill assist system.

17. The method of claim 14, wherein the ECU further comprises instructions for updating the center of gravity for the vehicle calculated to detect a shift in load while the vehicle is moving.

18. The method of claim 13, wherein the at least one load dependent vehicle characteristic is a desired tire pressure for each of the plurality of tires, and wherein the at least one recommended vehicle operating parameter adjusted based on the pressure is at least one of the plurality of tires.

19. The method of claim 13, wherein calculating the vehicle load further comprises using height information from the plurality of suspension sensors.

20. The method of claim 13, wherein the plurality of tire sensors include intelligent tire sensors.

* * * * *